(12) United States Patent
Yu

(10) Patent No.: US 11,143,895 B2
(45) Date of Patent: Oct. 12, 2021

(54) DISPLAY PANEL AND DISPLAY MODULE

(71) Applicant: Wuhan China Star Optoelectronics Technology Co., Ltd., Hubei (CN)

(72) Inventor: Pengfei Yu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/623,531

(22) PCT Filed: Nov. 5, 2019

(86) PCT No.: PCT/CN2019/115758
§ 371 (c)(1),
(2) Date: Dec. 17, 2019

(87) PCT Pub. No.: WO2021/031366
PCT Pub. Date: Feb. 25, 2021

(65) Prior Publication Data
US 2021/0055600 A1    Feb. 25, 2021

(30) Foreign Application Priority Data
Aug. 22, 2019    (CN) .......................... 201910776158.0

(51) Int. Cl.
*G02F 1/1333*    (2006.01)
*G02F 1/1339*    (2006.01)
*G02F 1/1335*    (2006.01)

(52) U.S. Cl.
CPC ...... *G02F 1/133351* (2013.01); *G02F 1/1339* (2013.01); *G02F 1/133512* (2013.01); *G02F 1/133514* (2013.01); *G02F 1/133528* (2013.01)

(58) Field of Classification Search
CPC .................................................. G02F 1/133351
See application file for complete search history.

(56) References Cited

U.S. PATENT DOCUMENTS

2008/0291376 A1* 11/2008 Chen ..................... G02F 1/1341
349/106
2014/0043569 A1* 2/2014 Yabuta ................ G02F 1/13338
349/104
2018/0101036 A1    4/2018 Wang et al.
(Continued)

FOREIGN PATENT DOCUMENTS

CN    203337945 U    12/2013
CN    106249466 A    12/2016
(Continued)

*Primary Examiner* — Edmond C Lau
(74) *Attorney, Agent, or Firm* — Hamre, Schumann, Mueller & Larson, P.C.

(57) ABSTRACT

The present disclosure provides a display panel and a display module, including a display area, a protection area surrounding the display area, a cutting area located at the periphery of the protection area; a first substrate and a second substrate disposed in the display area; a first light shielding layer patterned and disposed in the protection area and a second light shielding layer patterned and disposed in the cutting area, and at least one of the first light shielding layer, the second light shielding layer, and a color film layer of the first substrate or the second substrate are in a same layer.

18 Claims, 7 Drawing Sheets

(56) References Cited

U.S. PATENT DOCUMENTS

2018/0257974 A1\* 9/2018 Deng ................ G02F 1/133351
2020/0174309 A1 6/2020 Dong et al.

FOREIGN PATENT DOCUMENTS

| CN | 106873251 A | 6/2017 |
| CN | 108427226 A | 8/2018 |
| CN | 108807480 A | 11/2018 |
| CN | 108873461 A | 11/2018 |
| CN | 109860208 A | 6/2019 |
| JP | 2012032506 A | 2/2012 |
| KR | 20120047365 A | 5/2012 |
| KR | 20140141906 A | 12/2014 |

\* cited by examiner

DISPLAY PANEL AND DISPLAY MODULE

FIELD OF INVENTION

The present disclosure relates to the field of display technology, and more particularly, to a display panel and a display module.

BACKGROUND OF INVENTION

In the manufacturing process of existing flat panel display (FPD), the display panel motherboard is subjected to multiple cutting processes to obtain the final display panel.

The existing display panel motherboard includes a dicing street between two adjacent display panels, the dicing street is generally distributed with a light shielding layer and a base substrate on both sides of the light shielding layer, and the light shielding layer is generally made of a black photoresist. When cutting the display panel motherboard, since the black photoresist is an organic material and the bonding property of the corresponding substrate is weak, the cutting force generated during cutting easily separates the black photoresist from the color filter substrate, and the color filter substrate is separated from the array substrate, causing liquid crystal leakage in the display panel and reducing the yield of the display panel.

Therefore, there is a need for a display panel to solve the above technical problems.

SUMMARY OF INVENTION

The present disclosure provides a display panel and a display module to solve the technical problem that the existing display panel leaks liquid crystal during cutting.

To solve the above problems, the technical solution provided by the present disclosure is as follows:

The present disclosure provides a display panel including a display area, a protection area surrounding the display area; a cutting area located at a periphery of the protection area;

a first substrate, a second substrate, and a liquid crystal layer disposed in the display area, wherein the second substrate is disposed opposite to the first substrate, and the liquid crystal layer is disposed between the first substrate and the second substrate;

a first light shielding layer, wherein the first light shielding layer is patterned and disposed in the protection area; and a second light shielding layer, wherein the second light shielding layer is patterned and disposed in the cutting area, at least one of the first light shielding layer and the second light shielding layer and a color film layer of the first substrate or the second substrate are in the same layer and disposed discontinuously.

In the display panel of the present disclosure, the first substrate comprises a first base substrate and an array layer on the first base substrate, the second substrate comprises a second base substrate and the color film layer on the second base substrate;

the color film layer comprises a color filter layer and a black matrix layer;

the first light shielding layer and the second light shielding layer are disposed in the same layer with the black matrix layer.

In the display panel of the present disclosure, the first substrate comprises a first base substrate and an array layer on the first base substrate, the second substrate comprises a second base substrate and the color film layer on the second base substrate;

the color film layer comprises a color filter layer and a black matrix layer;

the first light shielding layer and the second light shielding layer are disposed in the same layer with the black matrix layer.

In the display panel of the present application, the protection area comprises a sealant area disposed adjacent to the display area, and a first light shielding area disposed away from the display area;

the first light shielding layer is located in the first light shielding area; and the first light shielding layer and the black matrix are disposed discontinuously.

In the display panel of the present disclosure, a sealant disposed in the sealant area, and the sealant is made of a black shading material.

In the display panel of the present disclosure, the first light shielding layer comprises at least one first groove; and the at least one first groove in the protection area is continuously or discontinuously disposed in a clockwise or counterclockwise direction around the display area;

wherein in a top view direction of the display panel, the at least one first groove is disposed in parallel with a boundary of the display area of display panel, or the at least one first groove is disposed in a curved line or a fold line in the protection area.

In the display panel of the present disclosure, further including a third light shielding layer disposed in the first light shielding area and located on the first substrate;

wherein the third light shielding layer comprises at least one protrusion, one of the at least one protrusion corresponds to one of the at least one first groove, an orthographic projection of the at least one protrusion on the first light shielding layer covers the at least one first groove.

In the display panel of the present disclosure, in a direction from the display area to the cutting area, the second light shielding layer comprises at least one second groove;

the second grooves in the cutting area are continuously or discontinuously disposed in a clockwise or counterclockwise direction around the display area;

wherein the at least one second groove causes the second light shielding layer in the cutting area and the first light shielding layer in the protection area to be discontinuously disposed.

In the display panel of the present disclosure, further comprising at least one light shielding unit disposed in the at least one second groove and disposed along the first direction or/and the second direction; and wherein the light shielding unit is disposed away from the protection area.

The present disclosure further provides a display module, including a display panel;

a polarizer layer on the display panel;

a cover layer on the polarizer layer;

wherein the display panel comprises:

a display area;

a protection area surrounding the display area;

a cutting area located at a periphery of the protection area;

a first substrate, a second substrate, and a liquid crystal layer disposed in the display area, wherein the second substrate is disposed opposite to the first substrate, and the liquid crystal layer is disposed between the first substrate and the second substrate;

a first light shielding layer, wherein the first light shielding layer is patterned and disposed in the protection area; and a second light shielding layer, wherein the second light shielding layer is patterned and disposed in the cutting area, at least one of the first light shielding layer and the second light shielding layer and a color film layer of the first substrate or the second substrate are in the same layer and disposed discontinuously.

In the display module of the present disclosure, the first substrate comprises a first base substrate and an array layer on the first base substrate, the second substrate comprises a second base substrate and the color film layer on the second base substrate;

the color film layer comprises a color filter layer and a black matrix layer;

the first light shielding layer and the second light shielding layer are disposed in the same layer with the black matrix layer.

In the display module of the present disclosure, further comprising a sealant disposed in the sealant area, and the sealant made of a black shading material.

In the display module of the present disclosure, the first light shielding layer comprises at least one first groove; and the at least one first groove in the protection area is continuously or discontinuously disposed in a clockwise or counterclockwise direction around the display area;

wherein in a top view direction of the display panel, the at least one first groove is disposed in parallel with a boundary of the display panel display area, or the at least one first groove is disposed in a curved line or a fold line in the protection area.

In the display module of the present disclosure, a depth of the at least one first groove is less than a thickness of the first light shielding layer.

In the display module of the present disclosure, further comprising a third light shielding layer disposed in the first light shielding area and located on the first substrate;

wherein the third light shielding layer comprises at least one protrusion, one of the at least one protrusion corresponds to one of the at least one first groove, an orthographic projection of the at least one protrusion on the first light shielding layer covers the at least one first groove.

In the display module of the present disclosure, in a direction from the display area to the cutting area, the second light shielding layer comprises at least one second groove;

the second grooves in the cutting area are continuously or discontinuously disposed in a clockwise or counterclockwise direction around the display area;

wherein the at least one second groove causes the second light shielding layer in the cutting area and the first light shielding layer in the protection area to be discontinuously disposed.

In the display module of the present disclosure, further comprising at least one light shielding unit disposed in the at least one second groove and disposed along the first direction or/and the second direction; and wherein the light shielding unit is disposed away from the protection area.

Beneficial effect: The present disclosure provides light shielding layer patterned and disposed in a protection area and a cutting area, which are away from the display area, so that the light shielding layers in the display area, the protection area and the cutting area are disposed discontinuously. When cutting the panel, the cutting force of the cutting area cannot be transmitted to the light shielding layers in the protection area and the display area, thereby preventing separation of the black photoresist from the color filter substrate and separation of the color filter substrate from the array substrate, ensuring the sealing property of the liquid crystal in the display panel and increasing product yield.

DESCRIPTION OF DRAWINGS

In order to more clearly illustrate the embodiments or the technical solutions in the prior art, the drawings to be used in the embodiments or the prior art description will be briefly described below. Obviously, the drawings in the following description are merely inventions. For those skilled in the art, other drawings may be obtained from these drawing without any inventive step.

DETAILED DESCRIPTION OF PREFERRED EMBODIMENTS

Figure 1:
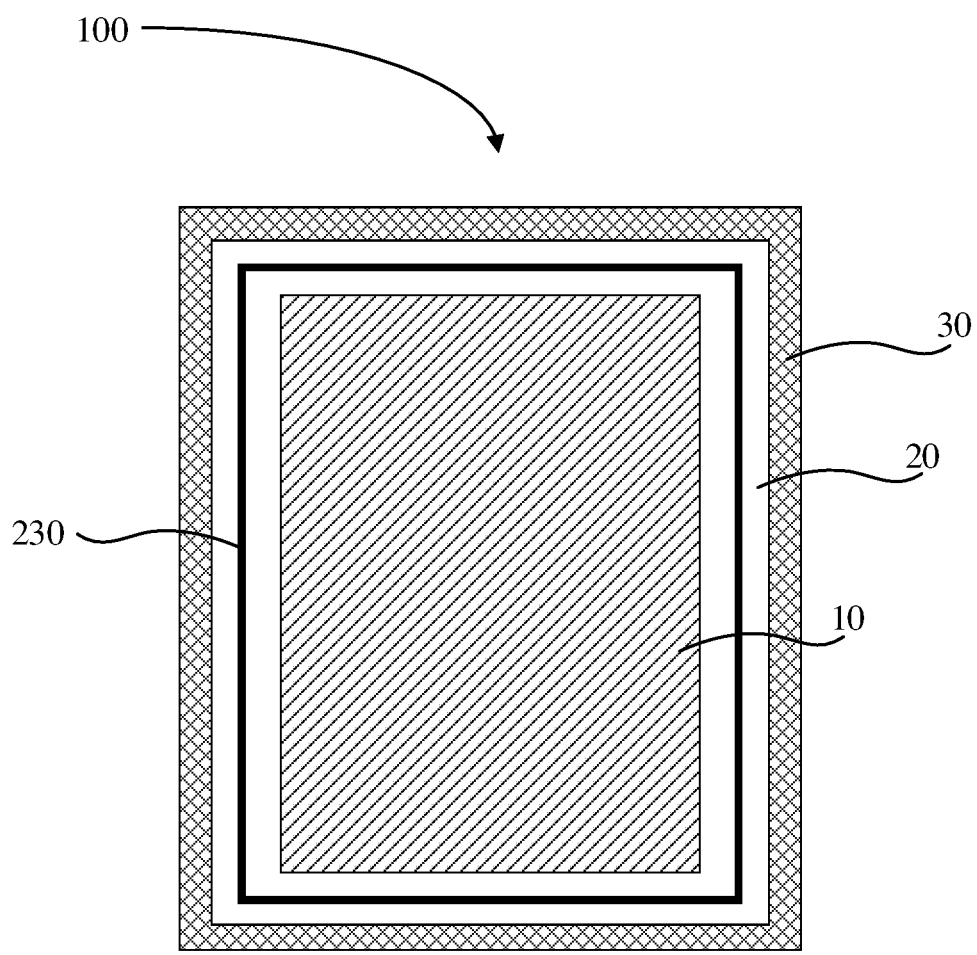
FIG. 1 is a first top structural diagram of a display panel of the present disclosure.

The following description of the various embodiments is provided to illustrate the specific embodiments. Directional terms described by the present disclosure, such as top, bottom, front, back, left, right, inner, outer, side, etc., are only directions by referring to the accompanying drawings, and thus the adopted terms are used only for the purpose of describing embodiments of the present disclosure, and are not intended to be limiting of the present disclosure. In the drawings, units with similar structures are labeled with the same reference number.

When cutting the display panel motherboard, because the black photoresist located in the cutting area has weak adhesion to the substrate, the cutting force generated during cutting easily separates the black photoresist from the color filter substrate and the color filter substrate from the array substrate, causing liquid crystal leakage in the display panel and reducing the yield of the display panel. Therefore, the present disclosure provides a display panel to solve the above technical problems.

Figure 2:
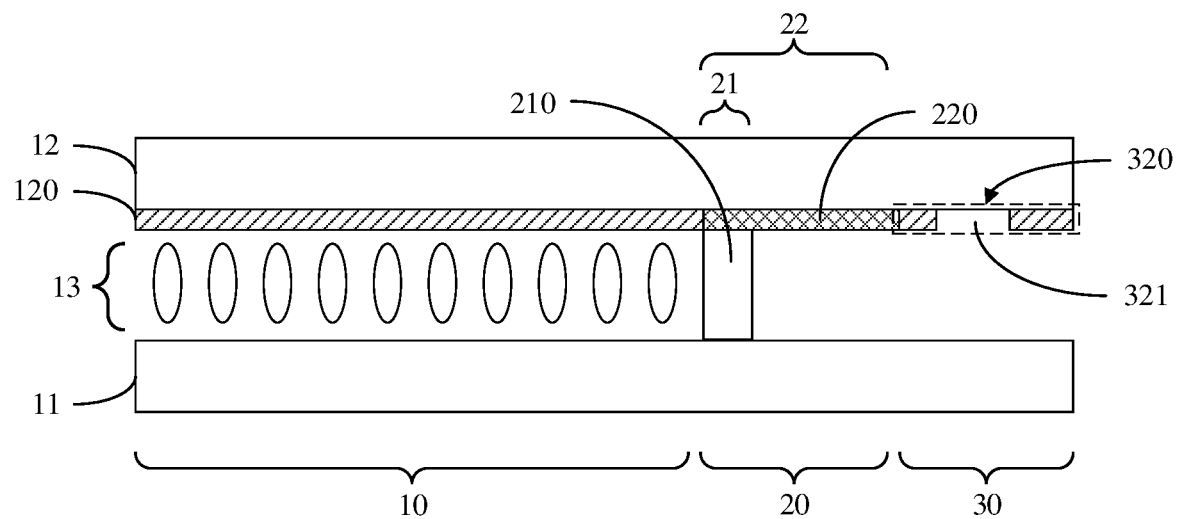
FIG. 2 is a first structural diagram of a display panel of the present disclosure.

Referring to FIG. 1 and FIG. 2, a display panel 100 includes a display area 10, a protection area 20 surrounding the display area 10, and a cutting area 30 located at a periphery of the protection area 20.

The display area 10 is provided with a first substrate 11, a second substrate 12 disposed opposite to the first substrate 11, and a liquid crystal layer 13 disposed between the first substrate 11 and the second substrate 12.

In this embodiment, the first substrate 11 may be one of an array substrate or a color filter substrate, and the second substrate 12 may be an array substrate or a color filter substrate different from the first substrate 11.

In this embodiment, a first light shielding layer 220 is patterned and disposed in the protection area 20, and a second light shielding layer 320 is patterned and disposed in the cutting area 30, and at least one of the first light shielding layer 220 and/or the second light shielding layer 320 and a color film layer of the first substrate 11 or the second substrate 12 are in the same layer and disposed discontinuously.

The present disclosure provides a patterned and disposed light shielding layer in the protection area 20 and the cutting area 30 away from the display area 10, so that the light shielding layer in the display area 10, the protection area 20, and the cutting area 30 are disposed discontinuously. When cutting the panel, the cutting force of the cutting area 30 cannot be transmitted to the light shielding layer of the protection area 20 and the display area 10, thereby preventing separation of the black photoresist from the color filter substrate and separation of the color filter substrate from the array substrate, ensuring the sealing property of the liquid crystal in the display panel 100 and increasing product yield.

Referring to FIG. 2, the first substrate 11 may be an array substrate, and the second substrate 12 may be a color filter substrate. The first substrate 11 includes a first base substrate and an array layer on the first base substrate, and the second substrate 12 includes a second base substrate and a color film layer on the second base substrate.

In this embodiment, the first base substrate and the second base substrate may be made of a flexible organic material, such as polyimide (PI), etc., and may also be made of a rigid inorganic material, such as quartz substrate, resin substrate, etc.

The array layer may include a plurality of thin film transistors, which may be an etch barrier type, a back channel etch type, a top gate transistor, or combinations thereof, and is not particularly limited. For example, the top gate transistor may include an active layer, a gate insulating layer, a gate layer, an interlayer dielectric layer, a source drain layer, etc.

The color film layer includes a color filter layer and a black matrix layer 120. The color filter layer includes a plurality of color patches. The color patches may include a red color block, a green color block, and a red color block. The black matrix layer 120 is disposed in the same layer as the color filter layer, and the black matrix layer 120 may be located between two adjacent color patches.

In this embodiment, the first light shielding layer 220 and the second light shielding layer 320 are disposed in the same layer as the black matrix layer 120. The first light shielding layer 220, the second light shielding layer 320, and the black matrix layer 120 may be formed by same photomask process.

Referring to FIG. 2, the protection area 20 includes a sealant area 21 and a first light shielding area 22.

In this embodiment, the first light shielding layer 220 is located in the first light shielding area 22.

In this embodiment, the sealant area 21 may be located in the first light shielding area 22. A sealant 210 is disposed in the sealant area 21. The sealant 210 is located between the first light shielding layer 220 and the first substrate 11.

The first light shielding layer 220 is continuously designed with the black matrix layer 120 in the display region 10, and the second light shielding layer 320 is discontinuously designed with the first light shielding layer 220.

Figure 3:
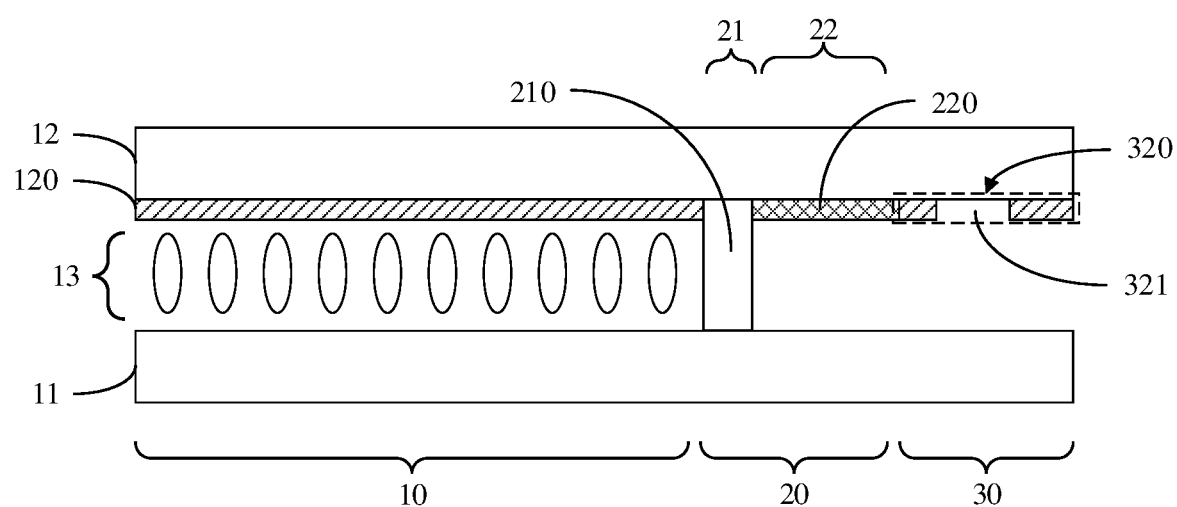
FIG. 3 is a second structural diagram of a display panel of the present disclosure.

Referring to FIG. 3, the protection area 20 includes a sealant area 21 disposed adjacent to the display region 10 and the first light shielding area 22 disposed away from the display region 10.

In this embodiment, the first light shielding layer 220 and the black matrix are disposed discontinuously. The first light shielding layer 220 is located in the first light shielding area 22. The first light shielding layer 220 is patterned to separate the first light shielding layer 220 from the black matrix layer 120 of the display region 10 to form a first opening 221. The sealant 210 in the sealant area 21 extends from the first substrate 11 to the second substrate 12 and fills the first opening 221.

In this embodiment, the sealant 210 is made of a black shading material. Since the black matrix in the sealant area 21 is removed, in order to prevent light leakage on a side of the product after cutting, the embodiment provides the sealant 210 made of the black shading material, thereby ensuring the possibility of preventing light leakage in the sealant area 21.

Figure 4:
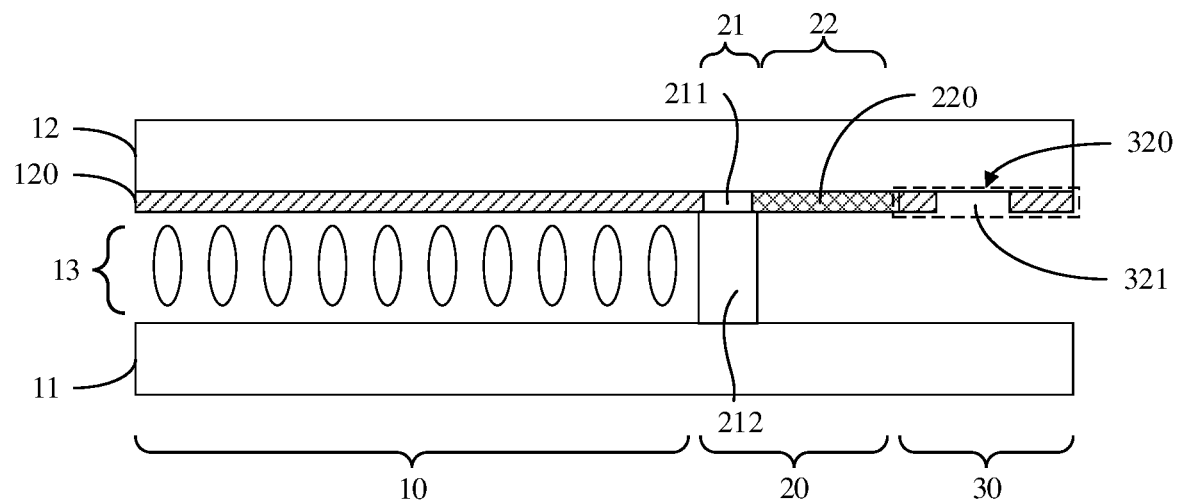
FIG. 4 is a third structural diagram of the display panel of the present disclosure.

Referring to FIG. 4, this embodiment is the same as or similar to FIG. 3, and the difference is:

An area of an orthographic projection of the sealant 210 on the first light shielding layer 220 is larger than an area of the first opening 221. Although the sealant 210 and the first light shielding layer 220 can ensure to prevent light leakage in the frame region, a certain gap between the sealant 210 and the first light shielding layer 220 may cause a risk of light leakage of the corresponding product. Therefore, the sealant 210 of this embodiment includes a first portion 211 embedded in the first opening 221 and a second portion 212 located between the first light shielding layer 220 and the first base substrate. An orthographic projection area of the second portion 212 on the first base substrate is greater than an orthographic projection area of the first portion 211 on the first base substrate.

In FIG. 3 and FIG. 4, the black matrix layer 120 of the display area 10 is separated from the first light shielding layer 220 of the protection area 20. When cutting the panel, the cutting force causes the first light shielding layer 220 to be separated from the corresponding base substrate, and the corresponding tearing force cannot be transmitted to the black matrix layer 120 of the display region 10, thereby preventing leakage of the liquid crystal.

Figure 5:
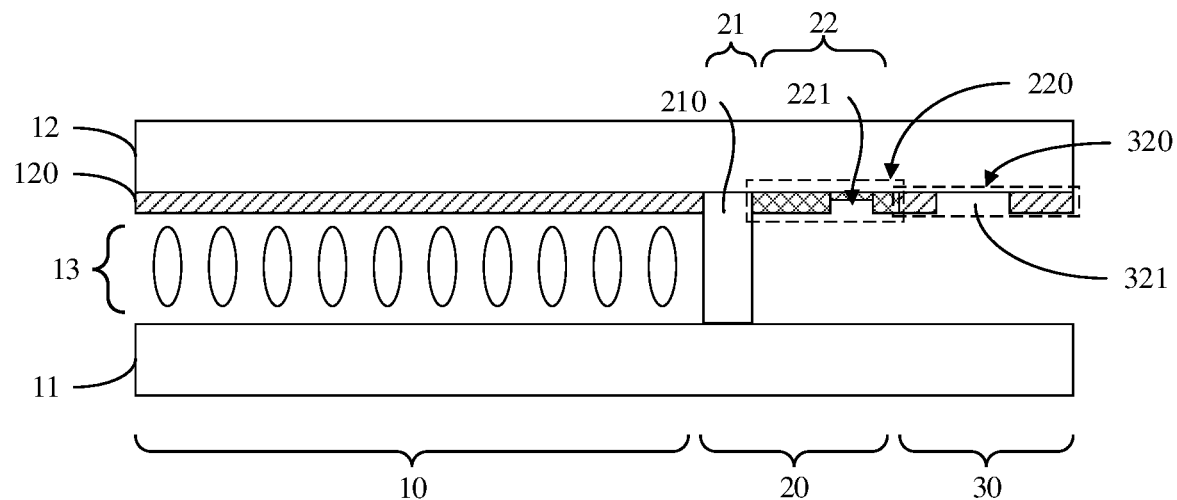
FIG. 5 is a fourth structural diagram of the display panel of the present disclosure.

Based on the FIG. 3, referring to FIG. 1 and FIG. 5, the first light shielding layer 220 includes at least one first groove 230. The at least one first groove 230 in the protection area 20 is continuously or discontinuously disposed in a clockwise or counterclockwise direction around the display area 10.

In a top view direction of the display panel 100, the at least one first groove 230 is disposed in parallel with a boundary of the display area 10 of the display panel 100, or the at least one first groove 230 is disposed in a curved line or a folded line in the protection area 20.

Figure 6:
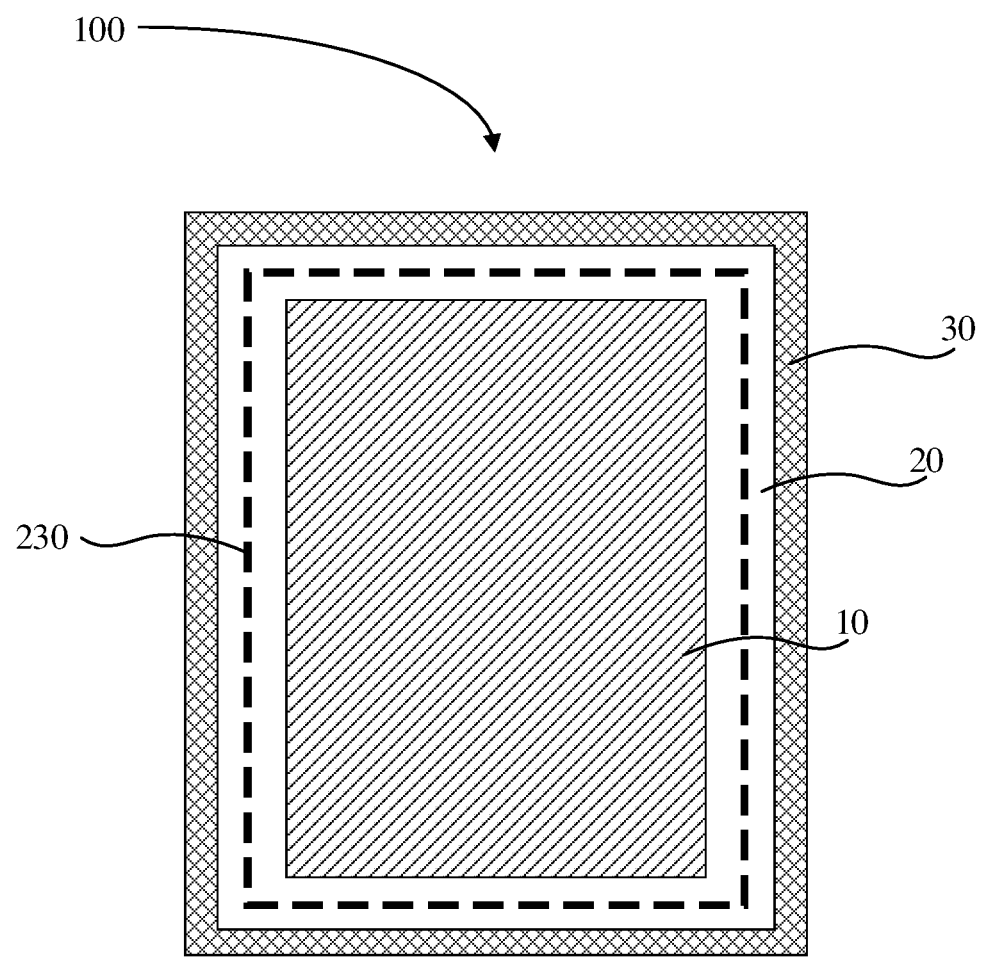
FIG. 6 is a second top structural diagram of the display panel of the present disclosure.

Referring to FIG. 6, a dotted line located in the protection area 20 in this embodiment is a schematic diagram of the first groove 230 being disposed discontinuously. The dotted line may be disposed in parallel or non-parallel with the peripheral boundary of the display area 10.

In a direction from the display area 10 to the protection area 20, the at least one first groove 230 is disposed in the protection area 20.

Figure 7:
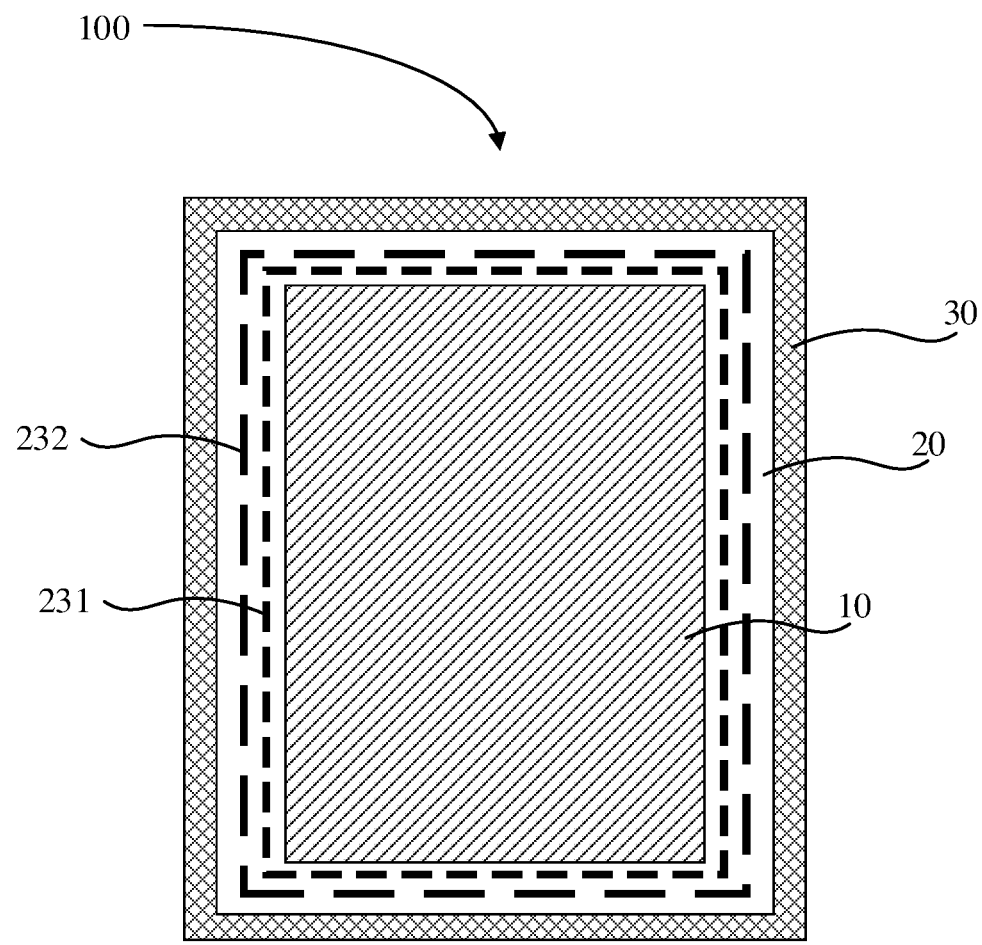
FIG. 7 is a third top structural diagram of the display panel of the present disclosure.

Referring to FIG. 7, the protection area 20 is provided with two first ring grooves 231 discontinuously, which are located near the display area 10, and a second ring groove 232 disposed away from the display area 10. The first ring grooves 231 may be dislocatedly disposed with the second ring groove 232 to prevent a cutting force from being transmitted from a non-grooved area between the two adjacent first grooves 230 to the inside of the display panel 100 when the grooves are discontinuously disposed.

In an embodiment, the first grooves 230 may be disposed in the protection area 20 in a spiral shape. The spiral shape of the first grooves 230 may be parallel or non-parallel to the boundary of the display region 10.

When cutting the panel, due to the rigid material of the first substrate and the second substrate, the cutting force generated during cutting is transmitted from the cutting area 30 to the display area 10, the substrate lobes located in the protection area 20 generate a compressive force that may act on the first light shielding layer 220 of the protection area 20, causing the first light shielding layer 220 to be detached from the base substrate. In this embodiment, a plurality of the first grooves 230 are disposed on the first light shielding layer 220 to disperse transmission direction of the cutting force, thereby preventing the separation of the first light shielding layer 220 and the second base substrate.

In this embodiment, the first groove 230 is not a through hole. That is, a depth of the first groove 230 is less than a thickness of the first light shielding layer 220. The above arrangement prevents the technical problem that light leakage occurs in the protection area 20 when the first groove 230 is a through hole.

Figure 8:
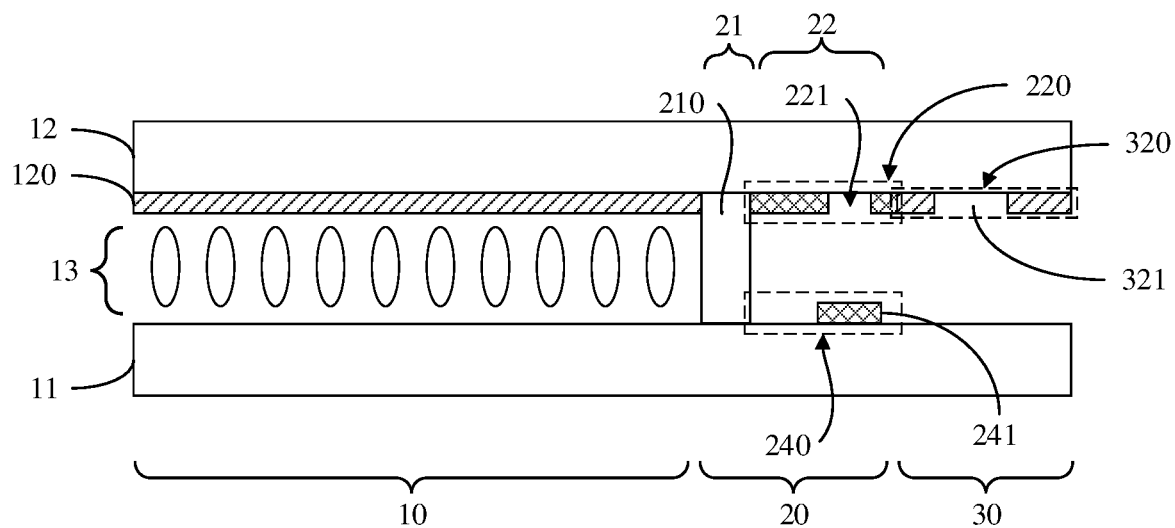
FIG. 8 is a fifth structural diagram of the display panel of the present disclosure.

When the first groove 230 is a through hole, please refer to FIG. 8, a third light shielding layer 240 is further disposed in the first light shielding area 22 in this embodiment. The third light shielding layer 240 is located on the first substrate 11, that is, the third light shielding layer 240 is located on the array layer.

In this embodiment, the third light shielding layer 240 includes at least one protrusion 241, and one of the at least one protrusion 241 corresponds to one of the at least one first groove 230, and an orthographic projection of the at least one protrusion 241 on the first light shielding layer 240 covers the at least one first groove 230.

Based on FIG. 5, this embodiment improves the technical problem of light leakage in the area corresponding to the first groove 230 in the protection area 20 by adding the third light shielding layer 240.

Referring to FIG. 2 to FIG. 5, in a direction from the display area 10 to the cutting area 30, the second light shielding layer 320 includes at least one second groove 321. Similar to the at least one first groove 230 in FIGS. 1, 6, and 8, the at least one second groove 321 in the cutting area 30 is continuously or discontinuously disposed in a clockwise or counterclockwise direction around the display area 10.

In this embodiment, the at least one second groove 321 causes the second light shielding layer 320 in the cutting area 30 and the first light shielding layer 220 in the protection area 20 to be discontinuously disposed.

Figure 9:
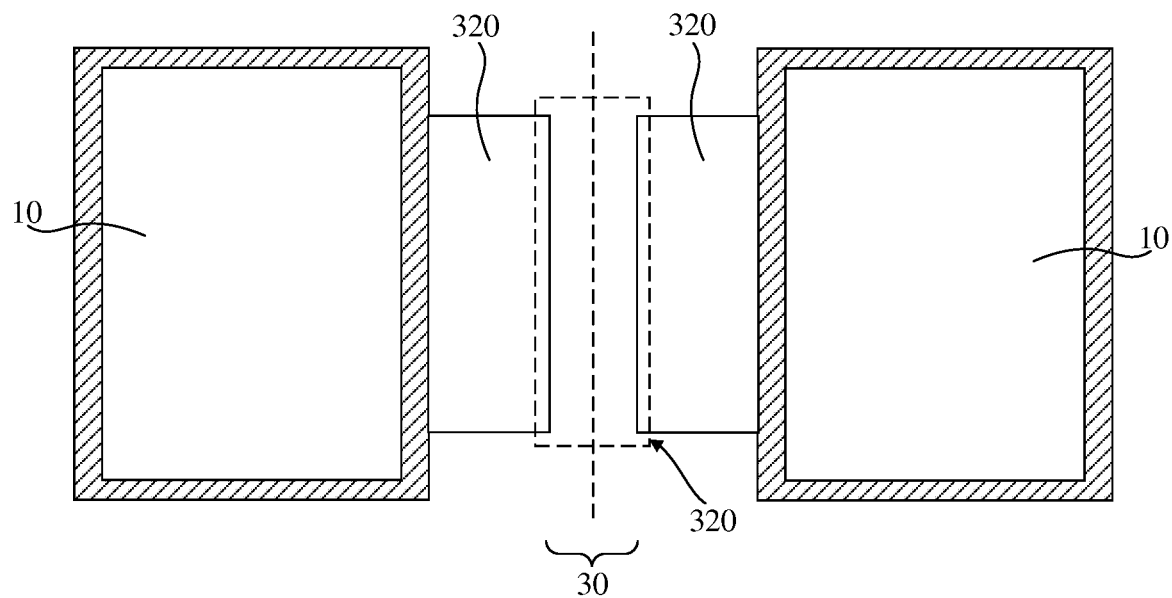
FIG. 9 is a fourth top structural diagram of the display panel of the present disclosure.

Referring to FIG. 9, in this embodiment, by removing the second light shielding layer 320 from the at least one second groove 321, when cutting the panel motherboard, the cutting force cannot be applied to the corresponding light shielding material, that is, the cutting force is transmitted into the display area 10 of the display panel 100, preventing leakage of the liquid crystal.

Figure 10:
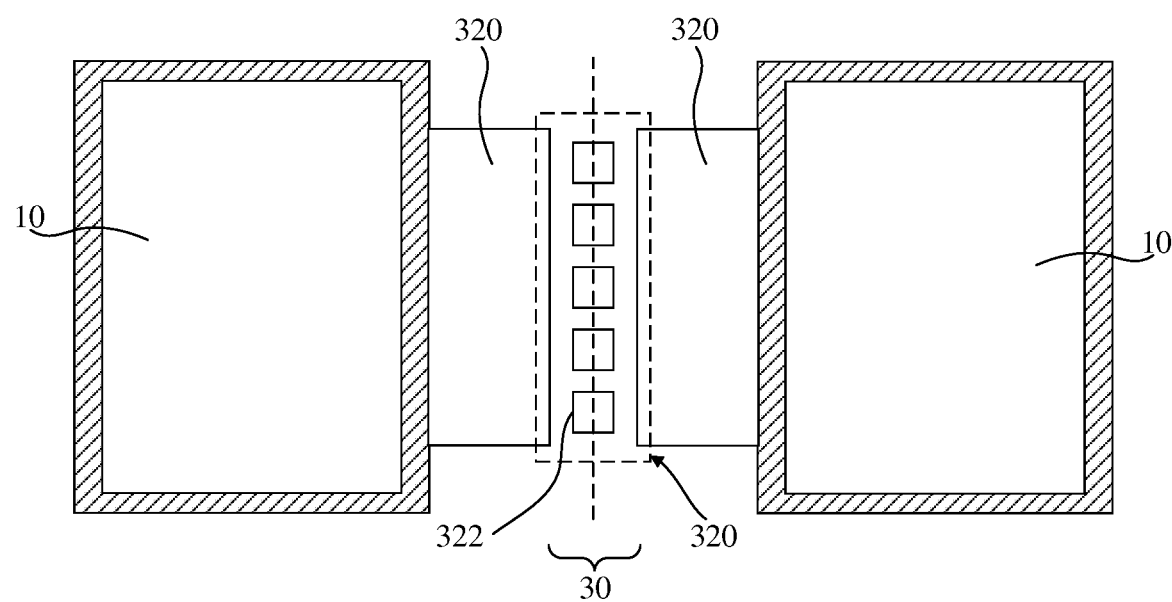
FIG. 10 is a fifth top structural diagram of the display panel of the present disclosure.

Referring to FIG. 10, the at least one second groove 321 may further include at least one shading unit 322 disposed in the at least one second groove 321 and disposed along a first direction or/and a second direction.

In this embodiment, the first direction may be a long side direction of the display panel 100, and the second direction may be a short side direction of the display panel 100.

In this embodiment, the at least one shading unit 322 is disposed away from the protection area 20.

In this embodiment, the second light shielding layer 320 is patterned and disposed in the groove, causing the at least one shading unit 322 to be located on the cutting line, that is, preventing to the generation of a greater cutting force on the first base substrate and the second base substrate due to a lack of filler between the first substrate and the second substrate in the cutting line region. At the same time, the at least one shading unit 322 disperses the diffusion of the cutting force toward the two sides of the first base substrate and the second base substrate. In addition, the at least one shading unit 322 is disposed away from the protection area 20, so that the cutting force acting on the shading unit 322 cannot be transmitted to the first light shielding layer 220 of the protection area 20, thereby further preventing the detachment of the black matrix of the display area 10 from the second substrate and ensuring the encapsulation of the liquid crystal.

The present disclosure also provides a display module, wherein the display module includes the above display panel, a polarizer layer on the display panel, and a cover layer on the polarizer layer. The working principle of the display module is the same as or similar to the above display panel, and details are not described herein again.

The present application also provides a display device, wherein the display device includes the above display module. The operating principle of the display device is the same as or similar to that of the above display module, and details are not described herein again.

The present disclosure provides a display panel and a display module, including a display area, a protection area surrounding the display area, a cutting area located at a periphery of the protection area; a first substrate, a second substrate, wherein the second substrate is disposed opposite to the first substrate, a first light shielding layer, wherein the first light shielding layer is patterned and disposed in the protection area; and a second light shielding layer, wherein the second light shielding layer is patterned and disposed in the cutting area, the first light shielding layer and the second light shielding layer and a color film layer of the first substrate or the second substrate are in the same layer. The present disclosure provides light shielding layers patterned and disposed in the protection area and the cutting area, which are away from the display area, so that the light shielding layers in the display area, the protection area, and the cutting area are disposed discontinuously. When cutting the panel, the cutting force of the cutting area cannot be transmitted to the light shielding layers in the protection area and the display area, thereby preventing separation of the black photoresist from the color filter substrate and separation of the color filter substrate from the array substrate, ensuring the sealing property of the liquid crystal in the display panel and increasing product yield.

In the above, although the present disclosure has been disclosed in the above preferred embodiments, the preferred embodiments are not intended to limit the present disclosure, and those skilled in the art can make various modifications without departing from the spirit and scope of the present disclosure. The protection scope of the present disclosure is determined by the scope defined by the claims.

What is claimed is:

1. A display panel, comprising:
a display area;

a protection area surrounding the display area;

a cutting area located at a periphery of the protection area;

a first substrate, a second substrate, and a liquid crystal layer disposed in the display area, wherein the second substrate is disposed opposite to the first substrate, and the liquid crystal layer is disposed between the first substrate and the second substrate;

a color film layer located on the first substrate or the second substrate;

a first light shielding layer, wherein the first light shielding layer is patterned and disposed in the protection area; and a second light shielding layer, wherein the second light shielding layer is patterned and disposed in the cutting area;

wherein the first light shielding layer, the second light shielding layer, and the color film layer of the first substrate or the second substrate are three distinct elements in a same layer as each other.

2. The display panel as claimed in claim 1, wherein the first substrate comprises a first base substrate and an array layer on the first base substrate, the second substrate comprises a second base substrate and the color film layer on the second base substrate;

the color film layer comprises a color filter layer and a black matrix layer; and the first light shielding layer and the second light shielding layer are disposed in a same layer as the black matrix layer.

3. The display panel as claimed in claim 2, wherein the protection area comprises a sealant area disposed adjacent to the display area, and a first light shielding area disposed away from the display area;

the first light shielding layer is located in the first light shielding area; and the first light shielding layer and the black matrix are disposed discontinuously.

4. The display panel as claimed in claim 3, further comprising a sealant disposed in the sealant area, and the sealant is made of a black shading material.

5. The display panel as claimed in claim 1, wherein the first light shielding layer comprises at least one first groove; and the at least one first groove in the protection area is continuously or discontinuously disposed in a clockwise or counterclockwise direction around the display area;

wherein in a top view direction of the display panel, the at least one first groove is disposed in parallel with a boundary of the display area of display panel, or the at least one first groove is disposed in a curved line or a folded line in the protection area.

6. The display panel as claimed in claim 5, wherein a depth of the at least one first groove is less than a thickness of the first light shielding layer.

7. The display panel as claimed in claim 5, further comprising a third light shielding layer disposed in a first light shielding area and located on the first substrate;

wherein the third light shielding layer comprises at least one protrusion, one of the at least one protrusion corresponds to one of the at least one first groove, and an orthographic projection of the at least one protrusion on the first light shielding layer covers the at least one first groove.

8. The display panel as claimed in claim 1, wherein in a direction from the display area to the cutting area, the second light shielding layer comprises at least one second groove;

the at least one second groove in the cutting area is continuously or discontinuously disposed in a clockwise or counterclockwise direction around the display area;

wherein the at least one second groove causes the second light shielding layer in the cutting area and the first light shielding layer in the protection area to be discontinuously disposed.

9. The display panel as claimed in claim 8, further comprising at least one light shielding unit disposed in the at least one second groove and disposed along a first direction or/and a second direction;

wherein the light shielding unit is disposed away from the protection area.

10. A display module, comprising:

a display panel;

a polarizer layer on the display panel; and a cover layer on the polarizer layer;

wherein the display panel comprises:

a display area;

a protection area surrounding the display area;

a cutting area located at a periphery of the protection area;

a first substrate, a second substrate, and a liquid crystal layer disposed in the display area, wherein the second substrate is disposed opposite to the first substrate, and the liquid crystal layer is disposed between the first substrate and the second substrate;

a color film layer located on the first substrate or the second substrate;

a first light shielding layer, wherein the first light shielding layer is patterned and disposed in the protection area; and a second light shielding layer, wherein the second light shielding layer is patterned and disposed in the cutting area;

wherein the first light shielding layer, the second light shielding layer, and the color film layer of the first substrate or the second substrate are three distinct elements in a same layer as each other.

11. The display module as claimed in claim 10, wherein the first substrate comprises a first base substrate and an array layer on the first base substrate, the second substrate comprises a second base substrate and the color film layer on the second base substrate;

the color film layer comprises a color filter layer and a black matrix layer; and the first light shielding layer and the second light shielding layer are disposed in a same layer as the black matrix layer.

12. The display module as claimed in claim 11, wherein the protection area comprises a sealant area disposed adjacent to the display area, and a first light shielding area disposed away from the display area;

the first light shielding layer is located in the first light shielding area; and the first light shielding layer and the black matrix are disposed discontinuously.

13. The display module as claimed in claim 12, further comprising a sealant disposed in the sealant area, and the sealant is made of a black shading material.

14. The display module as claimed in claim 10, wherein the first light shielding layer comprises at least one first groove; and the at least one first groove in the protection area is continuously or discontinuously disposed in a clockwise or counterclockwise direction around the display area;

wherein in a top view direction of the display panel, the at least one first groove is disposed in parallel with a boundary of the display panel display area, or the at least one first groove is disposed in a curved line or a folded line in the protection area.

15. The display module as claimed in claim 14, wherein a depth of the at least one first groove is less than a thickness of the first light shielding layer.

16. The display module as claimed in claim 14, further comprising a third light shielding layer disposed in a first light shielding area and located on the first substrate;
   wherein the third light shielding layer comprises at least one protrusion, one of the at least one protrusion corresponds to one of the at least one first groove, and an orthographic projection of the at least one protrusion on the first light shielding layer covers the at least one first groove.

17. The display module as claimed in claim 10, wherein in a direction from the display area to the cutting area, the second light shielding layer comprises at least one second groove;
   the at least one second groove in the cutting area is continuously or discontinuously disposed in a clockwise or counterclockwise direction around the display area;
   wherein the at least one second groove causes the second light shielding layer in the cutting area and the first light shielding layer in the protection area to be discontinuously disposed.

18. The display module as claimed in claim 17, further comprising at least one light shielding unit disposed in the at least one second groove and disposed along a first direction or/and a second direction;
   wherein the light shielding unit is disposed away from the protection area.

* * * * *